Oct. 3, 1933.  A. F. HICKMAN  1,928,651

FLYING MACHINE LANDING GEAR

Filed Nov. 6, 1931

Inventor
Albert F. Hickman
By Popp & Powers
Attorneys

Patented Oct. 3, 1933

1,928,651

UNITED STATES PATENT OFFICE 1,928,651

FLYING MACHINE LANDING GEAR

Albert F. Hickman, Eden, N. Y., assignor to Hickman Pneumatic Seat Co., Inc., Eden, N. Y., a corporation of New York Application November 6, 1931. Serial No. 573,325

19 Claims. (Cl. 244—2)

This invention particularly relates to a resilient landing gear for aeroplanes and other air craft and consisting of both the spring connection interposed between the landing wheels and the fuselage of said aeroplane and also the resilient means of connecting the tail skid to its fuselage. The invention is however applicable also to land vehicles.

The principal object of the invention is to permit the landing wheels and tail skid to be pressed up toward the fuselage against a gradually and at no time abruptly increased resistance, and to impose a similar gradual and at no time abrupt resistance to the rebound (downward) movement of the landing wheels and tail skid. Another object of the invention is to reduce to an irreducible minimum the "unsprung" weight of the parts connected directly with the landing wheels.

This invention is a continuation in part of my patent application for vehicle spring and shock absorber suspension No. 1,892,305, issued Dec. 27, 1932.

In the accompanying drawing.

Similar characters of reference indicate like parts in the several figures of the drawing in the following description:—

My invention may be embodied in various forms and in airship landing gears of different constructions, and the present application is therefore to be regarded merely as one organization which satisfactorily carries out the invention in practice. As here shown the same is constructed as follows:—

Figure 1:
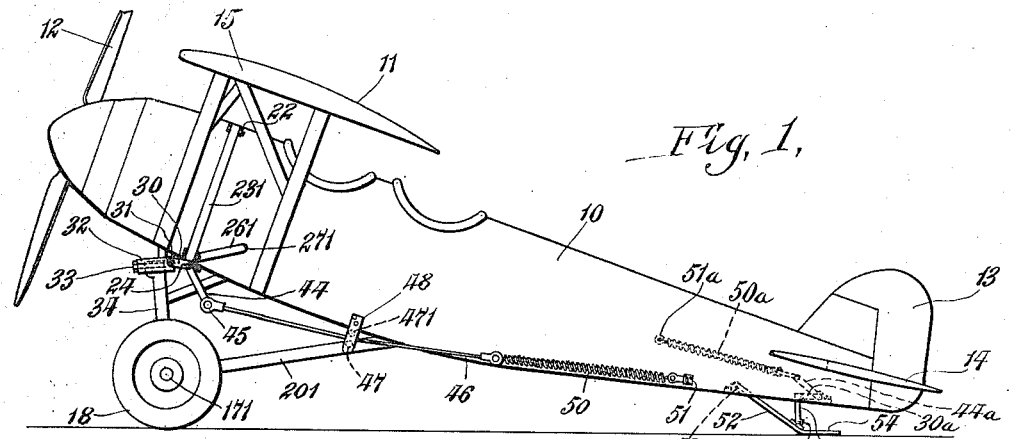
Figure 1 is a conventionalized side elevation of a monoplane aeroplane.
Figure 2:
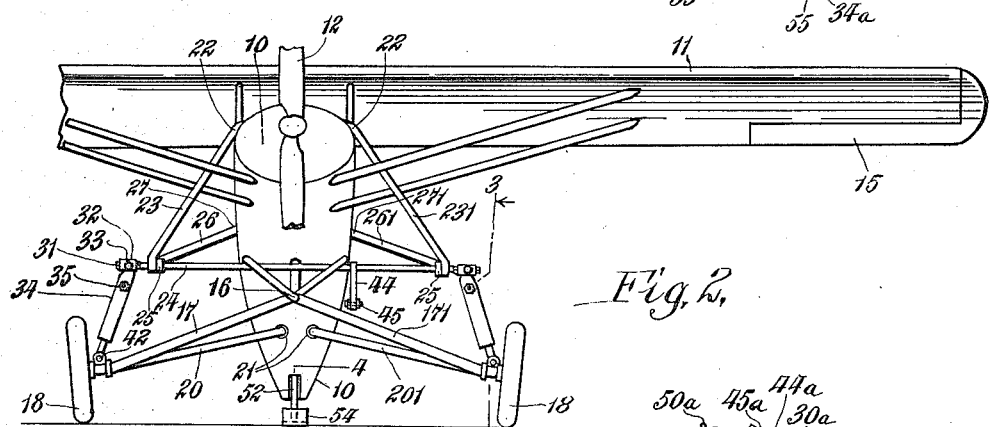
Figure 2 is a fragmentary front elevation thereof.
Figure 4:
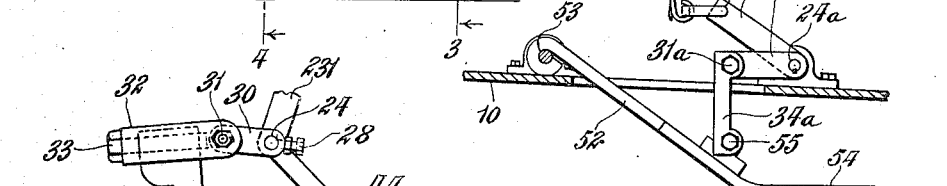
Figure 4 is an enlarged, fragmentary, vertical, longitudinal section of the tail skid taken on line 4—4 Fig. 2.
Figure 3:
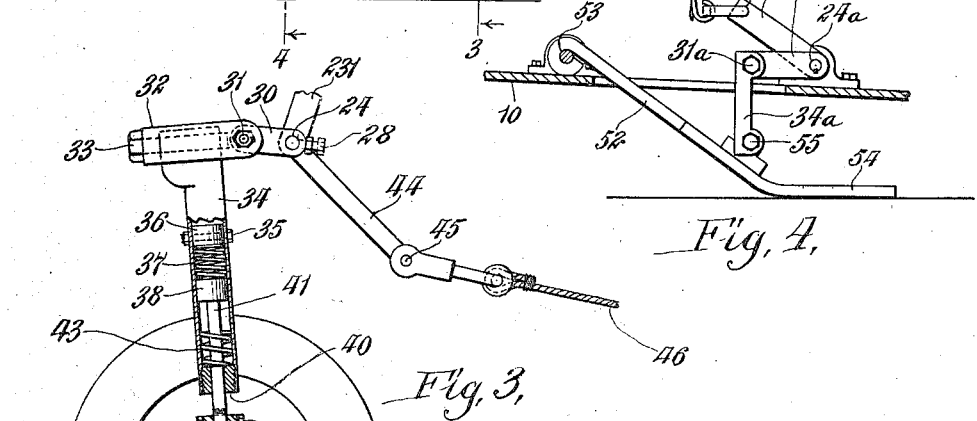
Figure 3 is an enlarged, fragmentary, vertical, longitudinal section of the aeroplane landing gear taken on line 3—3 Fig. 2.

The aeroplane shown in Figs. 1 and 2 comprises the usual body or fuselage 10, monoplane wing 11, propeller 12, rudder 13, elevator 14 and ailerons 15. Pivoted to the under forward part of said fuselage 10 at 16 (which is suitably braced to said fuselage) are a pair of axle sections 17 and 171 which, in the position shown in the drawing, make a dihedral angle with each other and extend downwardly and outwardly from said pivot 16 and have ground or landing wheels 18 journaled at their outer ends. To hold the outer ends of said axle sections 17 and 171 in proper horizontal alignment, and, at the same time to allow the same to move in an approximately vertical plane, a pair of radius rods 20 and 201 are provided, each of the same being connected at its front end to the outer part of a companion axle section and extending rearwardly and inwardly therefrom and pivotally connected at its rear end at 21 to the central underface of the fuselage 10.

Secured at 22 to the forward gunwale of the fuselage 10 and extending downwardly and laterally outwardly therefrom are a pair of arms 23 and 231 at the outer ends of which is journaled a rock shaft 24 provided with a pair of collars 25 which prevent longitudinal displacement of said rock shaft relatively to said arms 23 and 231. The outer ends of the latter are braced in any suitable manner, for instance by the braces 26 and 261, the front ends of each of which is secured to the lower ends of said arms 23 and 231, extending rearwardly and inwardly therefrom and secured at 27 and 271 to the bilge of the fuselage 10.

Secured by a set screw 28 or otherwise to each end of said rock shafts 24 is a rock arm 30, which, in the position of the drawing, extends substantially horizontally forward from said rock shaft 24 and is transversely pivoted at 31 to the rear parts of a companion rocking head 32, thereby allowing the latter to rise and fall vertically about the horizontal axis of the pivot 31.

Arranged perpendicularly of said transverse pivot 31 is a longitudinal pivot pin 33 which is secured in said rocking head 32 and extends substantially horizontal and longitudinally forward from said transverse pivot 31. Pivoted on said longitudinal pivot pin 33 is a primary spring casing 34 extending downwardly and somewhat rearwardly therefrom, said casing being in general of tubular or cylindrical form. Secured by a bolt 35 to said casing is a casing head 36 below which is arranged a helical, compression, primary spring 37. The lower face of said primary spring is adapted to be pressed upwardly (thereby compressing said spring) by a plunger 38 which slides in the manner of a piston up and down within said cylindrical casing 34. Threading into or otherwise secured within the lower bore of said primary spring casing 34 is a guide bushing 40, the bore of which slidingly receives a plunger rod 41, the latter being secured at its upper end to the plunger 38 and pivoted at its lower end at 42 to the outer end of its companion axle section 17 or 171 as the case may be. Interposed between the plunger 38 and the guide bushing 40 is a helical, compression, rebound spring 43 which acts as a cushion when its companion axle section moves down rapidly relatively to the fuselage 10.

Secured by welding or otherwise to the central part of the rock shaft 24 is a torque arm 44 which, in the position of the drawing, extends downwardly and rearwardly of said rock shaft. The lower end of said torque arm is pivoted at 45 to the forward end of a cable 46 which extends rearwardly from said torque arm and passes between a pair of parallel guide pulleys 47 and 471 arranged the one above the other. These pulleys are suitably journaled in a bracket 48 which is secured to and depends from the left hand bilge of the fuselage 10. The cable 46 continues rearwardly from said guide pulleys 47 and 471 and is connected at its terminal end to the front end of a helical tension, secondary spring 50. The rear end of said secondary spring is secured to the fuselage 10 by a suitable bracket 51.

A tail skid 52 is also provided, the same being pivoted at 53 to the lower part of the tail of the aeroplane and extending normally down and rearwardly from its pivot, and provided at its rear end with a splayed foot or shoe 54. Journaled above the rear end of said tail skid upon the inside face of the fuselage 10 is a tail-skid rock shaft 24a whose organization is analogous to that of the main rock shaft 24 of the landing wheels 18. In this case said tail-skid rock shaft 24a has secured thereto a forwardly projecting rock arm 30a which is pivoted at 31a to the upper end of a U shaped link 34a, the lower end of the latter being pivoted at 55 to the tail-skid 52. Secured to the rock shaft 24a is an upstanding torque arm 44a which is pivoted at 45a to the rear end of a helical tail-skid spring 50a. The front end of said spring is secured at 51a to the fuselage 10 of the aeroplane.

*Operation of aeroplane landing gear*

The only unsprung weight which is directly connected to either one of the wheels 18 of the aeroplane consists of the weight of the outer part of its companion axle section and the weight of the companion plunger rod 41 and its plunger 38. Obviously this unsprung weight is very small and the consequence, as far as this factor is involved, is that the aeroplane may land on the ground very heavily or taxi over very rough ground without injury to the fuselage, wings etc. and with a minimum of discomfort to the pilot and passengers.

The first sudden upward shock imposed by the upward movement of either (or both) of the wheels is cushioned by the primary spring 37. While the pressure of the latter is being built up this pressure is transmitted to the casing head 36, casing 34, rocking head 32 and thence to the pivot 31 which causes a partial clockwise rotation of the rock shaft. This rotation cannot however under any circumstances be brought to an abrupt stop inasmuch as the resistance to rotation caused by the secondary spring 50 is of a parabolic nature. This is because, as a theorectical limit of rotation, the pivot 31 may rise until it (its thrust) is in the same straight line with the axis of the rock shaft 24 and the axis of the wheel 18. In this theoretically limiting position an insignificant force exerted by the secondary spring 50 is capable of exerting an infinite amount of resistance to rotation of said rock shaft 24 and consequently also to the upward movement of the spring casing 34. As far as angular deflections of the rock shaft are concerned, the rock shaft 24 in actual practice does come quite close to this straight line relationship and the parts are accordingly constructed to allow of such a straight line relationship. Actually, however, mere upward pressure on the ground or landing wheels can never quite cause the thrust of the pivot 31 to pass through the axis of the rock shaft and the axis of the companion wheel. This is because as the rock shaft rotates, it is opposed by a resistance which may theoretically rise to infinity. As a consequence, the rotation is never abruptly stopped.

Despite this ability of the secondary spring to exert an infinite resistance to rotation, nevertheless its action is very sensitive in the position of the parts illustrated in the drawing, in which case a small increment of upward pressure on the pivot 31 causes a very considerable upward movement of said pivot. This obviously gives a soft yielding cushion effect to the spring suspension and allows of a large vertical movement of the wheels 18 and at the same time positively eliminates, parabolically, any possibility of a sudden or abrupt resistance to upward movement.

If a still greater upward movement of the wheels 18 is desired it is only necessary to increase the length of the rock arm 30 and to increase the strength of the secondary spring 50 or to decrease the length of the torque arm 44. In actual practice any desired vertical movement of the wheels may be obtained by a secondary spring of relatively light weight.

Provision is also made for the rebound of the spring suspension, i. e., the downward movement of either or both of the wheels 18 relatively to the fuselage 10. This rebound movement of each wheel is individually cushioned, in the first place, by its companion rebound spring 43 which directly softens the movement of the parts constituting the unsprung weight which is directly attached to and moves with the companion landing wheel 18. In addition to this the rebound movement is also cushioned by the same secondary spring 50 which cushions the upward movement of the wheels. The result is obtained by reason of the fact that when the pivot 45 of the torque arm 44 passes above the imaginary line which joins the axis of the rock shaft 24 with the rear end of the secondary spring 50, then said secondary spring resiliently opposes any further counter-clockwise rotation of said rock shaft 24. The resilient opposition increases in a parabolic manner identical with the hereinbefore described gradually increased resistance to clockwise movement caused by the same secondary spring 50. In other words, as the rock shaft 24 rotates in either direction, the effective resistance to rotation caused by the secondary spring 50 becomes equal to infinity when the thrust of the pivot 31 lies in a straight plane with the axis of the rock shaft 24 and the companion wheel 18.

During these various movements any binding of the moving parts is prevented by the pivotal connection between each spring casing 34 and its companion axle section 20 or 201 and also by the universal joint connection (pivots 33 and 31) between said spring casing and its companion rock arm 30.

Any whipping tendency of the cable 46 and secondary spring is prevented at its very inception by the guide pulleys 47 and 471.

In addition to the "non-bottoming" or parabolic resilient resistance to both up and down movement of each wheel 18, the present invention also prevents side sway of the machine when either one or both of the landing wheels 18 are on the ground. This effect is produced by the union of the two landing wheels 18 through the rock shaft 24 whereby an upward pressure on either one of said wheels 18 will not only be individually opposed by the secondary spring 50 (whose tension is such as to normally be capable of resisting the upward thrust of both wheels) but will also cause a lessening of the downward pressure imposed upon the other wheel 18. Thus, when there is a tendency for the fuselage 10 to side sway relatively to the wheels 18, then A., the "leeward" wheel 18 which is being pressed down heavily (due to the sway tendency) is resisted by doubling the resilient pressure which normally opposes upward movement of said wheel (this is true whether one or both wheels are on the ground) and B., the strength of the resilient force bearing down on the companion landing wheel is at the same time decreased, thereby reducing the normal tendency of this particular wheel to cause a side sway toward the "leeward" side of the aeroplane.

This latter factor is however only effective when each wheel is carrying some pressure. As far as the "leeward" wheel is concerned this pressure may be insignificant and yet the fullest anti-side sway effect obtained which may be insignificant and still be effective. This pressure may be insignificant and still be effective as regards this latter mentioned factor. The term "side sway" is ordinarily used to express the tendency of the fuselage to tip over sideways but it is obvious that the present invention not only prevents such a side sway but also helps to rapidly bring the aeroplane back to an even keel when only one of the landing wheels is in contact with the ground when it may be said that the aeroplane is already partially tipped over.

The tail skid is provided with the same "non-bottoming" parabolic feature that is provided in the spring suspension of the landing wheels 18. In other words, a very considerable up or down movement of the tail skid may be effected against a resilient resistance which is relatively low within this range but which, if said tail skid is moved far enough either up or down, finally becomes equal to infinity, a theoretical limit which obviously is never quite reached although it may be almost reached as regards actual angular measurements.

I claim as my invention:—

1. A flying machine landing gear associated with the fuselage of a flying machine and comprising a rock arm fulcrumed on said fuselage and pivotally connected at its outer end with a wheel and adapted to turn about its fulcrum sufficiently far to cause the plane of thrust through the axis of the pivot; at its outer end to pass through its fulcrum and parallel to the plane of the thrust exerted against said wheel; and means for resiliently restraining the turning of said rock arm about its fulcrum.

2. A flying machine landing gear associated with the fuselage of a flying machine and comprising a rock arm fulcrumed at its inner end on said fuselage; a leg pivoted to the outer end of said rock arm; a wheel arranged on said leg, the thrust of said wheel upon the pivot at the outer end of the rock arm being adapted to turn said rock arm about its fulcrum sufficiently far to cause the plane of said thrust through the axis of the pivot to pass through the fulcrum axis and parallel to the plane of the thrust exerted against said wheel; and means for resiliently restraining the turning of said rock arm about its fulcrum.

3. A flying machine landing gear associated with the fuselage of a flying machine and comprising a rock arm fulcrumed at its inner end on said fuselage; a leg pivoted to the outer end of said rock arm; a wheel arranged on said leg, the thrust of said wheel upon the pivot at the outer end of the rock arm being adapted to turn said rock arm about its fulcrum sufficiently far to cause the plane of the axis of said wheel to lie in the same straight line with the pivot and the fulcrum of said rock arm; and means for resiliently restraining the turning of said rock arm about its fulcrum.

4. A flying machine landing gear associated with the fuselage of a flying machine and comprising a rock arm fulcrumed on said fuselage and extending normally forward and substantially horizontally from its fulcrum, its forward end being pivotally connected with a wheel which is adapted to turn said rock arm about its axis sufficiently far to cause the plane of the thrust at the forward end of said rock arm to pass through the fulcrum of said rock arm and parallel to the plane of the thrust exerted against said wheel; and means for resiliently restraining the turning of said rock arm about its fulcrum.

5. A flying machine landing gear associated with the fuselage of a flying machine and comprising a rock arm fulcrumed on said fuselage and adapted to turn through one hundred and eighty degrees and extending normally forward and substantially horizontally from its fulcrum, its forward end being pivotally connected with a wheel which is adapted to turn said rock arm about its axis sufficiently far to cause the plane of the thrust at the forward end of said rock arm to pass through the fulcrum of said rock arm and parallel to the plane of the thrust exerted against said wheel; and means for resiliently restraining the turning of said rock arm about its fulcrum.

6. A flying machine landing gear associated with the fuselage of a flying machine and comprising a rock arm fulcrumed on said fuselage and adapted to turn through one hundred and eighty degrees and extending normally forward and substantially horizontally from its fulcrum, its forward end being pivotally connected with a wheel which is adapted to turn said rock arm about its axis sufficiently far to cause the plane of the thrust at the forward end of said rock arm to pass through the fulcrum of said rock arm and parallel to the plane of the thrust exerted against said wheel; and means for resiliently restraining the turning of said rock arm about its fulcrum toward its limit of travel.

7. A flying machine landing gear associated with the fuselage of a flying machine and comprising a rock arm fulcrumed on said fuselage and adapted to turn about its fulcrum sufficiently far to cause the plane of the thrust at its outer end to pass through its fulcrum and parallel to the plane of the thrust exerted against said wheel; a wheel; a primary spring interposed between said wheel and the outer end of said rock arm; and means for restraining the turning of said rock arm about its fulcrum.

8. A flying machine landing gear associated with the fuselage of a flying machine and comprising a rock arm fulcrumed on said fuselage and adapted to turn about its fulcrum sufficiently far in either the one or the other direction to cause the plane of the thrust at its outer end to pass through its fulcrum and parallel to the plane of the thrust exerted against said wheel; a wheel; a primary spring interposed between said wheel and the outer end of said rock arm; and means for restraining the turning of said rock arm about its fulcrum.

9. A flying machine landing gear associated with the fuselage of a flying machine and comprising a rock arm fulcrumed on said fuselage and adapted to turn about its fulcrum sufficiently far to cause the plane of the thrust at its outer end to pass substantially vertically through its fulcrum; an axle section pivoted on said fuselage and connected with the outer end of said rock arm; and a wheel mounted at the outer end of said axle section.

10. A flying machine landing gear associated with the fuselage of a flying machine and comprising a rock shaft journaled transversely in said fuselage; a rock arm arranged at each end of said shaft and adapted to turn with said rock shaft sufficiently far to permit the plane of the thrust at its outer end to pass through the axis of said rock shaft; and a wheel connected with the outer end of each rock arm and adapted to carry a load thrust in a plane parallel to aforesaid plane.

11. A flying machine landing gear associated with the fuselage of a flying machine and comprising a rock shaft journaled transversely in said fuselage; a rock arm arranged at each end of said shaft and adapted to turn with said rock shaft sufficiently far to permit the plane of the thrust at its outer end to pass through the axis of said rock shaft; a wheel connected with the outer end of each rock arm and adapted to carry a load thrust in a plane parallel to aforesaid plane; and means for resiliently restraining rotation of said rock shaft.

12. A flying machine landing gear associated with the fuselage and wheel of a flying machine and comprising a rock shaft journaled in said fuselage; a rock arm arranged on said shaft and adapted to turn with said rock shaft sufficiently far to permit the plane of the thrust at its outer end to pass through the axis of said rock shaft; a primary spring interposed between one of said wheels and the outer end of said rock arm; and means for resiliently restraining rotation of said rock shaft.

13. A flying machine landing gear associated with the fuselage and wheel of a flying machine and comprising a rock shaft journaled transversely in said fuselage; a rock arm arranged on said shaft and adapted to turn with said rock shaft sufficiently far to permit the plane of the thrust at its outer end to pass through the axis of said rock shaft parallel to the thrust on said wheel; a primary spring interposed between one of said wheels and the outer end of said rock arm; and means for resiliently restraining rotation of said rock shaft.

14. A flying machine landing gear associated with the fuselage and wheel of a flying machine and comprising a rock shaft journaled in said fuselage; a rock arm arranged on said shaft and adapted to turn with said rock shaft sufficiently far to permit the plane of the thrust at its outer end to pass through the axis of said rock shaft parallel to the thrust on said wheel; a primary spring connected at one end to one of said wheels and connected at its other end to the outer end of said rock arm; and means for resiliently restraining rotation of said rock shaft.

15. A flying machine landing gear associated with the fuselage and wheel of a flying machine and comprising a rock shaft journaled in said fuselage; a rock arm arranged on said shaft and adapted to turn with said rock shaft sufficiently far to permit the plane of the thrust at its outer end to pass through the axis of said rock shaft parallel to the thrust on said wheel; a primary helical spring interposed between one of said wheels and the outer end of said rock arm; and means for resiliently restraining rotation of said rock shaft.

16. A flying machine landing gear associated with the fuselage and wheel of a flying machine and comprising a rock shaft journaled in said fuselage; a rock arm arranged on said shaft; a spring casing pivoted to the outer end of said rock arm; a primary spring disposed within said casing and resiliently interposed between said casing and one of the airship wheels; and means for resiliently restraining rotation of said rock shaft.

17. A flying machine landing gear associated with the fuselage and wheel of a flying machine and comprising a rock shaft journaled in said fuselage; a rock arm arranged on said shaft; a spring casing pivoted to the outer end of said rock arm; a plunger connected with one of the airship wheels; a primary spring disposed within said casing and resiliently interposed between said casing and said plunger; and means for resiliently restraining rotation of said rock shaft.

18. A flying machine landing gear associated with the fuselage and wheel of a flying machine and comprising a rock shaft journaled in said fuselage; a rock arm arranged on said shaft; a spring casing pivoted to the outer end of said rock arm; a plunger connected with one of the airship wheels; a primary spring arranged within said casing and above said plunger and interposed between said plunger and the upper end of said casing; a rebound spring arranged within said casing and below said plunger and interposed between said plunger and the lower end of said casing; and means for resiliently restraining rotation of said rock shaft.

19. A flying machine landing gear associated with the fuselage and wheel of a flying machine and comprising a tail skid movably connected with said fuselage; a rock arm fulcrumed on said fuselage and connected with said tail skid; and means for resiliently resisting the turning of said rock arm about its fulcrum.

ALBERT F. HICKMAN.